US011740859B2

(12) United States Patent
Alexander et al.

(10) Patent No.: US 11,740,859 B2
(45) Date of Patent: *Aug. 29, 2023

(54) MEDIA-COMPENSATED PASS-THROUGH AND MODE-SWITCHING

(71) Applicant: Dolby Laboratories Licensing Corporation, San Francisco, CA (US)

(72) Inventors: Mark Alexander, San Francisco, CA (US); Chunjian Li, Beijing (CN); Joshua Brandon Lando, Mill Valley, CA (US); Alan J. Seefeldt, Alameda, CA (US); C. Phillip Brown, Castro Valley, CA (US); Dirk Jeroen Breebaart, Pyrmont (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/660,951

(22) Filed: Apr. 27, 2022

(65) Prior Publication Data

US 2022/0253274 A1 Aug. 11, 2022

Related U.S. Application Data

(63) Continuation of application No. 17/248,992, filed on Feb. 16, 2021, now Pat. No. 11,354,088, which is a
(Continued)

(30) Foreign Application Priority Data

Jun. 14, 2016 (WO) ................ PCT/CN2016/085697

(51) Int. Cl.
G06F 3/16 (2006.01)
H04R 1/10 (2006.01)
(Continued)

(52) U.S. Cl.
CPC ............ G06F 3/165 (2013.01); H04B 15/00 (2013.01); H04R 1/1041 (2013.01);
(Continued)

(58) Field of Classification Search
CPC ...... G06F 3/165; H04R 5/033; H04R 2430/01
See application file for complete search history.

(56) References Cited

U.S. PATENT DOCUMENTS 7,512,245 B2 3/2009 Rasmussen
7,599,507 B2 10/2009 Hansen
(Continued)

FOREIGN PATENT DOCUMENTS

CN 101385385 3/2009
DE 102014207914 11/2015
(Continued)

OTHER PUBLICATIONS

Moore, Brian C.J. et al "A Model for the Prediction of Thresholds, Loudness, and Partial Loudness" Journal of the Audio Engineering Society, New York, vol. 45, No. 4, Apr. 1, 1997, pp. 224-240.

Primary Examiner — Ping Lee

(57) ABSTRACT

Media input audio data corresponding to a media stream and microphone input audio data from at least one microphone may be received. A first level of at least one of a plurality of frequency bands of the media input audio data, as well as a second level of at least one of a plurality of frequency bands of the microphone input audio data, may be determined. Media output audio data and microphone output audio data may be produced by adjusting levels of one or more of the first and second plurality of frequency bands based on the perceived loudness of the microphone input audio data, of the microphone output audio data, of the media output audio
(Continued)

data and the media input audio data. One or more processes may be modified upon receipt of a mode-switching indication.

20 Claims, 8 Drawing Sheets

Related U.S. Application Data continuation of application No. 16/309,230, filed as application No. PCT/US2017/037380 on Jun. 14, 2017, now Pat. No. 11,016,721.

(60) Provisional application No. 62/357,127, filed on Jun. 30, 2016.

(51) Int. Cl.
*H04B 15/00* (2006.01)
*H04R 3/04* (2006.01)
*H04R 29/00* (2006.01)
*H04R 5/033* (2006.01)
*H04R 5/04* (2006.01)

(52) U.S. Cl.
CPC .............. *H04R 1/1083* (2013.01); *H04R 3/04* (2013.01); *H04R 29/001* (2013.01); *H04R 5/033* (2013.01); *H04R 5/04* (2013.01); *H04R 2201/107* (2013.01); *H04R 2430/01* (2013.01); *H04R 2460/01* (2013.01)

(56) References Cited

U.S. PATENT DOCUMENTS

| 7,853,031 | B2 | 12/2010 | Hamacher |
| 8,488,809 | B2 | 7/2013 | Seefeldt |
| 8,498,426 | B2 | 7/2013 | Bonanno |
| 8,611,560 | B2 | 12/2013 | Goldstein |
| 8,744,067 | B2 | 6/2014 | Ho |
| 9,210,517 | B2 | 12/2015 | Pontoppidan |
| 2008/0137873 | A1 | 6/2008 | Goldstein |
| 2010/0034397 | A1 | 2/2010 | Nakadai |
| 2010/0111337 | A1 | 5/2010 | Silber |
| 2011/0091056 | A1 | 4/2011 | Nishizaki |
| 2011/0164855 | A1* | 7/2011 | Crockett ............... G10L 21/02 |
| | | | 386/230 |
| 2012/0082330 | A1 | 4/2012 | Kornagel |
| 2012/0281856 | A1 | 11/2012 | Georgiou |
| 2013/0170672 | A1 | 7/2013 | Groeschel |
| 2013/0259244 | A1 | 10/2013 | Christensen |
| 2014/0126734 | A1 | 5/2014 | Gauger, Jr. |
| 2014/0126736 | A1 | 5/2014 | Gauger, Jr. |
| 2014/0270200 | A1 | 9/2014 | Usher |
| 2014/0270294 | A1 | 9/2014 | Andersen |
| 2015/0003625 | A1 | 1/2015 | Uhle |
| 2015/0104022 | A1 | 4/2015 | Deng |
| 2015/0215701 | A1 | 7/2015 | Usher |
| 2015/0222977 | A1 | 8/2015 | Angel, Jr. |
| 2015/0296086 | A1 | 10/2015 | Eckert et al. |
| 2016/0012827 | A1 | 1/2016 | Alves |
| 2016/0088403 | A1 | 3/2016 | Lambe |
| 2016/0163168 | A1 | 6/2016 | Brav |
| 2016/0165336 | A1 | 6/2016 | Di Censo |
| 2017/0156006 | A1 | 6/2017 | Dennis |
| 2017/0280253 | A1 | 9/2017 | Oplinger |
| 2017/0359467 | A1 | 12/2017 | Norris |

FOREIGN PATENT DOCUMENTS

| EP | 2925015 | 9/2015 |
| JP | 2014085673 | 5/2014 |
| JP | 2015005993 | 1/2015 |
| JP | 2016506640 A | 3/2016 |
| JP | 2016510198 A | 4/2016 |
| WO | 2008061260 | 5/2008 |
| WO | 2011095912 | 8/2011 |
| WO | 2012054248 A1 | 4/2012 |
| WO | 2014022359 | 2/2014 |
| WO | 2014194932 | 12/2014 |
| WO | WO 2014194932 | 12/2014 |
| WO | 2015103578 A1 | 7/2015 |
| WO | 2015148658 | 10/2015 |
| WO | 2015148767 | 10/2015 |
| WO | 2016209295 | 12/2016 |

* cited by examiner

MEDIA-COMPENSATED PASS-THROUGH AND MODE-SWITCHING

CROSS-REFERENCE TO RELATED APPLICATIONS

This application is a continuation of and claims the benefit of priority from U.S. patent application Ser. No. 17/248,992, filed Feb. 16, 2021, which is a continuation of and claims the benefit of priority from U.S. patent application Ser. No. 16/309,230, filed Dec. 12, 2018, which is a U.S. national phase of PCT International Application No. PCT/US2017/037380 filed Jun. 14, 2017, which claims the benefit of priority to U.S. Application No. 62/357,127, filed Jun. 30, 2016, and which also claims the benefit of priority to PCT International Application No. PCT/CN2016/085697, filed Jun. 14, 2016, all of which are hereby incorporated by reference in their entireties.

TECHNICAL FIELD

This disclosure relates to processing audio data. In particular, this disclosure relates to processing media input audio data corresponding to a media stream and microphone input audio data from at least one microphone.

BACKGROUND

The use of audio devices such as headphones and earbuds has become extremely common. Such audio devices can at least partially occlude sounds from the outside world. Some headphones are capable of creating a substantially closed system between headphone speakers and the eardrum, in which sounds from the outside world are greatly attenuated. There are various potential advantages of attenuating sounds from the outside world via headphones or other such audio devices, such as eliminating distortion, providing a flat equalization, etc. However, when wearing such audio devices a user may not be able to hear sounds from the outside world that it would be advantageous to hear, such as the sound of an approaching car, the sound of a friend's voice, etc.

SUMMARY

Some methods disclosed herein may involve receiving media input audio data corresponding to a media stream and receiving microphone input audio data from at least one microphone. As used herein, the terms "media stream," "media signal" and "media input audio data" may be used to refer to audio data corresponding to music, a podcast, a movie soundtrack, etc. However the terms are not limited to such examples. Instead, the terms "media stream," "media signal" and "media input audio data" may be used to refer to the audio data corresponding to other sounds received for playback, e.g., as part of a telephone conversation. Some methods may involve determining a first level of at least one of a plurality of frequency bands of the media input audio data and determining a second level of at least one of a plurality of frequency bands of the microphone input audio data. Some such methods may involve producing media output audio data and microphone output audio data by adjusting levels of one or more of the first and second plurality of frequency bands. For example, some methods may involve adjusting levels such that a first difference between a perceived loudness of the microphone input audio data and a perceived loudness of the microphone output audio data in the presence of the media output audio data is less than a second difference between the perceived loudness of the microphone input audio data and a perceived loudness of the microphone input audio data in the presence of the media input audio data. Some such methods may involve mixing the media output audio data and the microphone output audio data to produce mixed audio data. Some such examples may involve providing the mixed audio data to speakers of an audio device, such as a headset or earbuds.

In some implementations, the adjusting may involve only boosting the levels of one or more of the plurality of frequency bands of the microphone input audio data. However, in some examples the adjusting may involve both boosting the levels of one or more of the plurality of frequency bands of the microphone input audio data and attenuating the levels of one or more of the plurality of frequency bands of the media input audio data. The perceived loudness of the microphone output audio data in the presence of the media output audio data may, in some examples, be substantially equal to the perceived loudness of the microphone input audio data. According to some examples, the total loudness of the media and microphone output audio data may be in a range between the total loudness of the media and microphone input audio data and the total loudness of the media and microphone output audio data. However, in some instances, the total loudness of the media and microphone output audio data may be substantially equal to the total loudness of the media and microphone input audio data, or may be substantially equal to the total loudness of the media and microphone output audio data.

Some implementations may involve receiving (or determining) a mode-switching indication and modifying one or more process based, at least in part, on the mode-switching indication. For example, some implementations may involve modifying at least one of the receiving, determining, producing or mixing process based, at least in part, on the mode-switching indication. In some instances, the modifying may involve increasing a relative loudness of the microphone output audio data, relative to a loudness of the media output audio data. According to some such examples, increasing the relative loudness of the microphone output audio data may involve suppressing the media input audio data or pausing the media stream.

According to some implementations, the mode-switching indication may be based, at least in part, on an indication of a head movement and/or an indication of an eye movement. In some such implementations, the mode-switching indication may be based, at least in part, on inertial sensor data. The inertial sensor data may, for example, correspond to movement of a headset. In some instances, an indication of an eye movement may include camera data and/or electroencephalogram data.

Some examples may involve determining a direction of a sound source based, at least in part, on microphone data from two or more microphones. Some such examples may involve determining whether the direction of the sound source corresponds with a head movement and/or an eye movement. Alternatively, or additionally, some examples may involve receiving an indication from a user of a selected sound source direction. Some such examples may involve determining a direction of a sound source based, at least in part, on microphone data from two or more microphones. Some such examples may involve determining that the location of the sound source is a mode-switching indication if the location of the sound source corresponds with the selected sound source direction.

Some other examples may involve determining a direction of a sound source based, at least in part, on microphone data from two or more microphones. Some such examples may involve determining whether there is a mode-switching indication based, at least in part, on the movement direction of the sound source. Some such examples may involve determining a mode-switching indication based, at least in part, on a determination that the movement direction of the sound source may be towards at least one of the microphones.

Alternatively, or additionally, some examples may involve determining a velocity of the sound source Some such examples may involve determining a mode-switching indication based, at least in part, on a determination that the velocity of the sound source exceeds a threshold.

According to some implementations, the mode-switching indication may be based, at least in part, on recognition of speech in the microphone input audio data. Some such examples may involve a classification of the microphone input audio data. For example, the classification may involve determining whether the microphone input audio data includes a car horn, an approaching vehicle sound, a scream, a yell, a pre-selected person's voice, a pre-selected key word and/or a public announcement. The mode-switching indication may be based, at least in part, on the classification.

The methods disclosed herein may be implemented via hardware, firmware, software stored in one or more non-transitory media, and/or combinations thereof. For example, at least some aspects of this disclosure may be implemented in an apparatus that includes an interface system and a control system. The interface system may include a user interface and/or a network interface. In some implementations, the apparatus may include a memory system. The interface system may include at least one interface between the control system and the memory system.

The control system may include at least one processor, such as a general purpose single- or multi-chip processor, a digital signal processor (DSP), an application specific integrated circuit (ASIC), a field programmable gate array (FPGA) or other programmable logic device, discrete gate or transistor logic, discrete hardware components, and/or combinations thereof.

According to some examples, the control system may be capable of receiving media input audio data corresponding to a media stream and receiving microphone input audio data from at least one microphone. In some implementations, the apparatus may include a microphone system having one or more microphones. In some examples, the microphone system may include two or more microphones. In some implementations, the apparatus may include a speaker system that includes one or more speakers. According to some such implementations, the apparatus may be a headset, or a component of a headset. However, in other implementations the apparatus may be configured for receiving microphone input audio data and/or media input audio data corresponding to a media stream from another device.

In some examples, the control system may be capable of determining a first level of at least one of a plurality of frequency bands of the media input audio data and determining a second level of at least one of a plurality of frequency bands of the microphone input audio data. The control system may, for example, be capable of producing media output audio data and microphone output audio data by adjusting levels of one or more of the first and second plurality of frequency bands. For example, the control system may be capable of adjusting levels such that a first difference between a perceived loudness of the microphone input audio data and a perceived loudness of the microphone output audio data in the presence of the media output audio data is less than a second difference between the perceived loudness of the microphone input audio data and a perceived loudness of the microphone input audio data in the presence of the media input audio data. In some examples, the control system may be capable of mixing the media output audio data and the microphone output audio data to produce mixed audio data. According to some examples, the control system may be capable of providing the mixed audio data to speakers of an audio device, such as a headset or earbuds.

In some implementations, the adjusting may involve only boosting the levels of one or more of the plurality of frequency bands of the microphone input audio data. However, in some examples the adjusting may involve both boosting the levels of one or more of the plurality of frequency bands of the microphone input audio data and attenuating the levels of one or more of the plurality of frequency bands of the media input audio data. The perceived loudness of the microphone output audio data in the presence of the media output audio data may, in some examples, be substantially equal to the perceived loudness of the microphone input audio data. According to some examples, the total loudness of the media and microphone output audio data may be in a range between the total loudness of the media and microphone input audio data and the total loudness of the media and microphone output audio data. However, in some instances, the total loudness of the media and microphone output audio data may be substantially equal to the total loudness of the media and microphone input audio data, or may be substantially equal to the total loudness of the media and microphone output audio data.

According to some examples, the control system may be capable of receiving (or determining) a mode-switching indication and of modifying one or more process based, at least in part, on the mode-switching indication. For example, the control system may be capable of modifying at least one of the receiving, determining, producing or mixing process based, at least in part, on the mode-switching indication. In some instances, the modifying may involve increasing a relative loudness of the microphone output audio data, relative to a loudness of the media output audio data. According to some such examples, increasing the relative loudness of the microphone output audio data may involve suppressing the media input audio data or pausing the media stream.

According to some implementations, the control system may be capable of determining the mode-switching indication based, at least in part, on an indication of a head movement and/or an indication of an eye movement. In some such implementations, the apparatus may include an inertial sensor system. According to some such implementations, the control system may be capable of determining the mode-switching indication based, at least in part, on inertial sensor data received from the inertial sensor system. The inertial sensor data may, for example, correspond to movement of a headset.

In some instances, the apparatus may include an eye movement detection system. According to some such implementations, the control system may be capable of determining the mode-switching indication based, at least in part, on data received from the eye movement detection system. The eye movement detection system may, in some examples, include one or more cameras. The eye movement detection system may, in some examples, include an electroencephalogram (EEG) system, which may include one or more EEG electrodes. According to some implementations, the EEG electrodes may be configured to be positioned in a user's ear canal and/or on the user's scalp. According to some such examples, the control system may be capable of detecting a user's eye movements via analysis of an EEG signal received from one or more EEG electrodes of the EEG system. In some such examples, the control system may be capable of determining a mode-switching indication based, at least in part, on an indication of an eye movement. The indication of the eye movement may be based on camera data and/or EEG data from the eye movement detection system.

According to some examples, the control system may be capable of determining a direction of a sound source based, at least in part, on microphone data from two or more microphones. According to some such examples, the control system may be capable of determining whether the direction of the sound source corresponds with a head movement and/or an eye movement. Alternatively, or additionally, the control system may be capable of receiving an indication from a user of a selected sound source direction. In some such examples, the control system may be capable of determining a direction of a sound source based, at least in part, on microphone data from two or more microphones. The control system may, for example, be capable of determining that the location of the sound source is a mode-switching indication if the location of the sound source corresponds with the selected sound source direction.

Some other examples may involve determining a direction of a sound source based, at least in part, on microphone data from two or more microphones. In some such examples, the control system may be capable of determining whether there is a mode-switching indication based, at least in part, on the movement direction of the sound source. In some such examples, the control system may be capable of may involve determining a mode-switching indication based, at least in part, on a determination that the movement direction of the sound source may be towards at least one of the microphones.

Alternatively, or additionally, the control system may be capable of determining a velocity of the sound source. In some such examples, the control system may be capable of determining a mode-switching indication based, at least in part, on a determination that the velocity of the sound source exceeds a threshold.

According to some implementations, the mode-switching indication may be based, at least in part, on recognition of speech in the microphone input audio data. In some such examples, the control system may be capable of making a classification of the microphone input audio data. For example, the classification may involve determining whether the microphone input audio data includes a car horn, an approaching vehicle sound, a scream, a yell, a pre-selected person's voice, a pre-selected key word and/or a public announcement. The mode-switching indication may be based, at least in part, on the classification.

Some implementations may include one or more non-transitory media having software stored thereon. In some examples, the non-transitory media may include flash memory, a hard drive and/or other memory devices. The software may include instructions for controlling at least one apparatus for receiving media input audio data corresponding to a media stream and receiving microphone input audio data from at least one microphone. The software may include instructions for determining a first level of at least one of a plurality of frequency bands of the media input audio data and determining a second level of at least one of a plurality of frequency bands of the microphone input audio data. The software may include instructions for producing media output audio data and microphone output audio data by adjusting levels of one or more of the first and second plurality of frequency bands. For example, the software may include instructions for adjusting levels such that a first difference between a perceived loudness of the microphone input audio data and a perceived loudness of the microphone output audio data in the presence of the media output audio data is less than a second difference between the perceived loudness of the microphone input audio data and a perceived loudness of the microphone input audio data in the presence of the media input audio data. In some examples, the software may include instructions for mixing the media output audio data and the microphone output audio data to produce mixed audio data. Some such examples may involve providing the mixed audio data to speakers of an audio device, such as a headset or earbuds.

In some implementations, the adjusting may involve only boosting the levels of one or more of the plurality of frequency bands of the microphone input audio data. However, in some examples the adjusting may involve both boosting the levels of one or more of the plurality of frequency bands of the microphone input audio data and attenuating the levels of one or more of the plurality of frequency bands of the media input audio data. The perceived loudness of the microphone output audio data in the presence of the media output audio data may, in some examples, be substantially equal to the perceived loudness of the microphone input audio data. According to some examples, the total loudness of the media and microphone output audio data may be in a range between the total loudness of the media and microphone input audio data and the total loudness of the media and microphone output audio data. However, in some instances, the total loudness of the media and microphone output audio data may be substantially equal to the total loudness of the media and microphone input audio data, or may be substantially equal to the total loudness of the media and microphone output audio data.

In some examples, the software may include instructions for receiving (or determining) a mode-switching indication and for modifying one or more process based, at least in part, on the mode-switching indication. For example, in some implementations the software may include instructions for modifying at least one of the receiving, determining, producing or mixing process based, at least in part, on the mode-switching indication. In some instances, the modifying may involve increasing a relative loudness of the microphone output audio data, relative to a loudness of the media output audio data. According to some such examples, the software may include instructions for increasing the relative loudness of the microphone output audio data by suppressing the media input audio data or pausing the media stream.

According to some implementations, the software may include instructions for determining the mode-switching indication based, at least in part, on an indication of a head movement and/or an indication of an eye movement. In some such implementations, the software may include instructions for determining the mode-switching indication based, at least in part, on inertial sensor data. The inertial sensor data may, for example, correspond to movement of a headset. In some instances, an indication of an eye movement may include camera data and/or electroencephalogram data.

In some examples, the software may include instructions for determining a direction of a sound source based, at least in part, on microphone data from two or more microphones. In some such examples, the software may include instructions for determining whether the direction of the sound source corresponds with a head movement and/or an eye movement. Alternatively, or additionally, in some examples the software may include instructions for receiving an indication from a user of a selected sound source direction. In some such examples, the software may include instructions for determining a direction of a sound source based, at least in part, on microphone data from two or more microphones. In some such examples, the software may include instructions for determining that the location of the sound source is a mode-switching indication if the location of the sound source corresponds with the selected sound source direction.

Some other examples may involve determining a direction of a sound source based, at least in part, on microphone data from two or more microphones. According to some implementations, the software may include instructions for determining whether there is a mode-switching indication based, at least in part, on the movement direction of the sound source. Some such examples may involve determining a mode-switching indication based, at least in part, on a determination that the movement direction of the sound source may be towards at least one of the microphones.

Alternatively, or additionally, in some examples the software may include instructions for determining a velocity of the sound source. In some such examples, the software may include instructions for determining a mode-switching indication based, at least in part, on a determination that the velocity of the sound source exceeds a threshold.

According to some implementations, the mode-switching indication may be based, at least in part, on recognition of speech in the microphone input audio data. In some such examples, the software may include instructions for making a classification of the microphone input audio data. For example, the classification may involve determining whether the microphone input audio data includes a car horn, an approaching vehicle sound, a scream, a yell, a pre-selected person's voice, a pre-selected key word and/or a public announcement. In some such examples, the software may include instructions for determining a mode-switching indication based, at least in part, on the classification.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DESCRIPTION OF EXAMPLE EMBODIMENTS

Figure 1A:
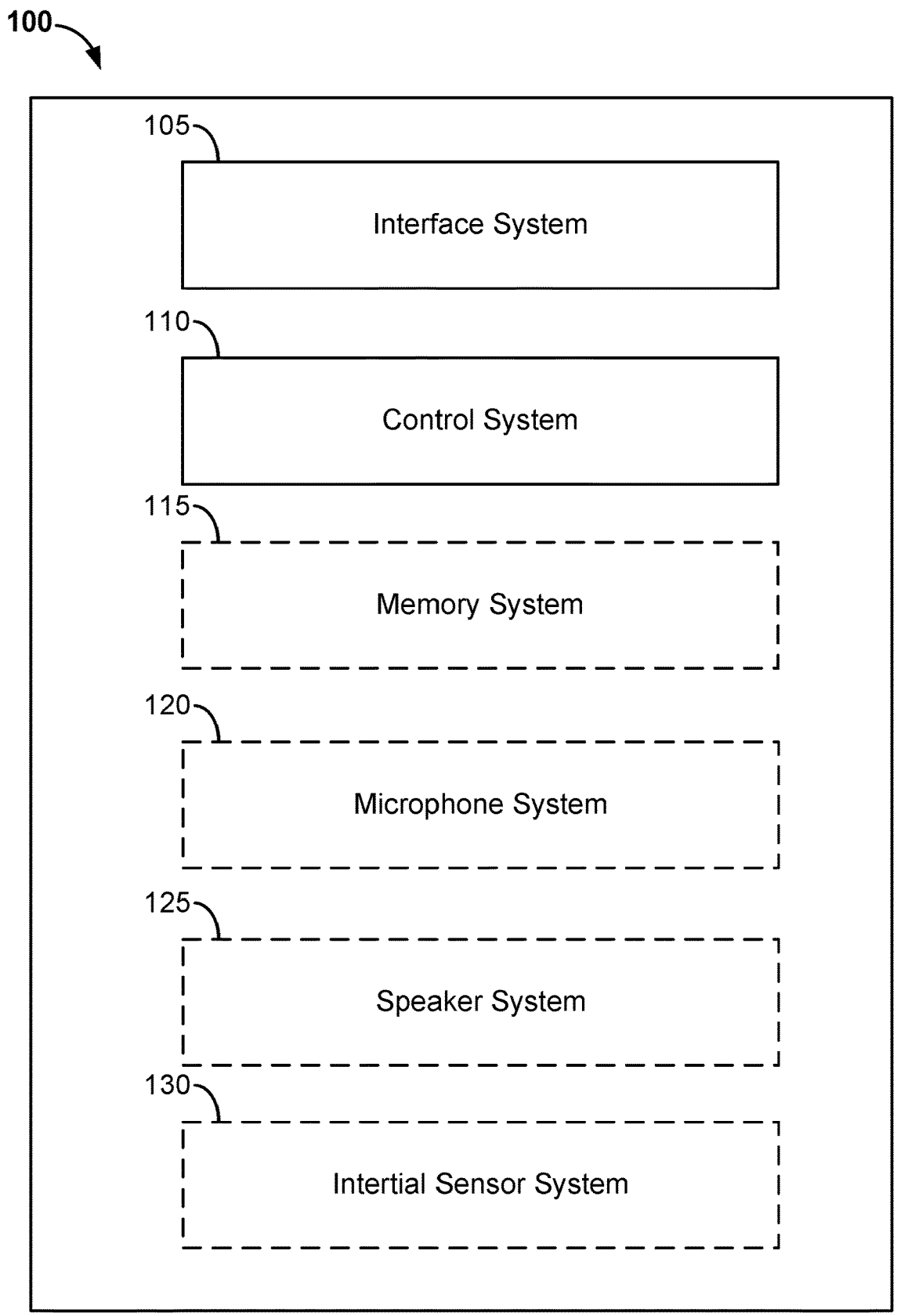
FIG. 1A is a block diagram that shows examples of components of an apparatus capable of implementing various aspects of this disclosure.

The following description is directed to certain implementations for the purposes of describing some innovative aspects of this disclosure, as well as examples of contexts in which these innovative aspects may be implemented. However, the teachings herein can be applied in various different ways. For example, while various implementations are described in terms of particular audio devices, the teachings herein are widely applicable to other known audio devices, as well as audio devices that may be introduced in the future. Moreover, the described implementations may be implemented, at least in part, in various devices and systems as hardware, software, firmware, cloud-based systems, etc. Accordingly, the teachings of this disclosure are not intended to be limited to the implementations shown in the figures and/or described herein, but instead have wide applicability.

As noted above, audio devices that provide at least some degree of sound occlusion provide various potential benefits, such an improved ability to control audio quality. Other benefits include attenuation of potentially annoying or distracting sounds from the outside world. However, a user of such audio devices may not be able to hear sounds from the outside world that it would be advantageous to hear, such as the sound of an approaching car, a car horn, a public announcement, etc.

Accordingly, one or more types of sound occlusion management would be desirable. Various implementations described herein involve sound occlusion management during times that a user is listening to a media stream of audio data via headphones, earbuds, or another such audio device. As used herein, the terms "media stream," "media signal" and "media input audio data" may be used to refer to audio data corresponding to music, a podcast, a movie soundtrack, etc., as well as the audio data corresponding to sounds received for playback as part of a telephone conversation. In some implementations, such as earbud implementations, the user may be able to hear a significant amount of sound from the outside world even while listening to audio data corresponding to a media stream. However, some audio devices (such as headphones) can significantly attenuate sound from the outside world. Accordingly, some implementations may also involve providing microphone data to a user. The microphone data may provide sounds from the outside world.

When a microphone signal corresponding to sound external to an audio device, such as a headphone, is mixed with the media signal and played back through speakers of the headphone, the media signal often masks the microphone signal, making the external sound inaudible or unintelligible to the listener. As such, it is desirable to process both the microphone and media signal such that when mixed, the microphone signal is audible above the media signal, and both the processed microphone and media signal remain perceptually natural-sounding. In order to achieve this effect, it is useful to consider a model of perceptual loudness and partial loudness, such as disclosed herein. Some such implementations provide one or more types of pass-through mode. In a pass-through mode, a media signal may be reduced in volume, and the conversation between the user and other people (or other external sounds of interest to the user, as indicated by the microphone signal) may be mixed into the audio signal provided to a user. In some examples, the media signal may be temporarily silenced.

FIG. 1A is a block diagram that shows examples of components of an apparatus capable of implementing various aspects of this disclosure. In this example, the apparatus 100 includes an interface system 105 and a control system 110. The interface system 105 may include one or more network interfaces, one or more user interfaces and/or one or more external device interfaces (such as one or more universal serial bus (USB) interfaces). In some examples, the interface system 105 may include one or more interfaces between the control system 110 and a memory system, such as the optional memory system 115 shown in FIG. 1A. However, the control system 110 may include a memory system. The control system 110 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components. In some implementations, the control system 110 may be capable of performing, at least in part, the methods disclosed herein.

Some or all of the methods described herein may be performed by one or more devices according to instructions (e.g., software) stored on non-transitory media. Such non-transitory media may include memory devices such as those described herein, including but not limited to random access memory (RAM) devices, read-only memory (ROM) devices, etc. The non-transitory media may, for example, reside in the optional memory system 115 shown in FIG. 1A and/or in the control system 110. Accordingly, various innovative aspects of the subject matter described in this disclosure can be implemented in a non-transitory medium having software stored thereon. The software may, for example, include instructions for controlling at least one device to process audio data. The software may, for example, be executable by one or more components of a control system such as the control system 110 of FIG. 1A.

In some examples, the apparatus 100 may include an optional microphone system 120 that includes one or more microphones, an optional speaker system 125 that includes one or more speakers and/or an optional inertial sensor system 130 that includes one or more inertial sensors, as shown in FIG. 1A. Some examples of microphone configurations are disclosed herein. The inertial sensors may, for example, include one or more accelerometers or gyroscopes.

Figure 1B:
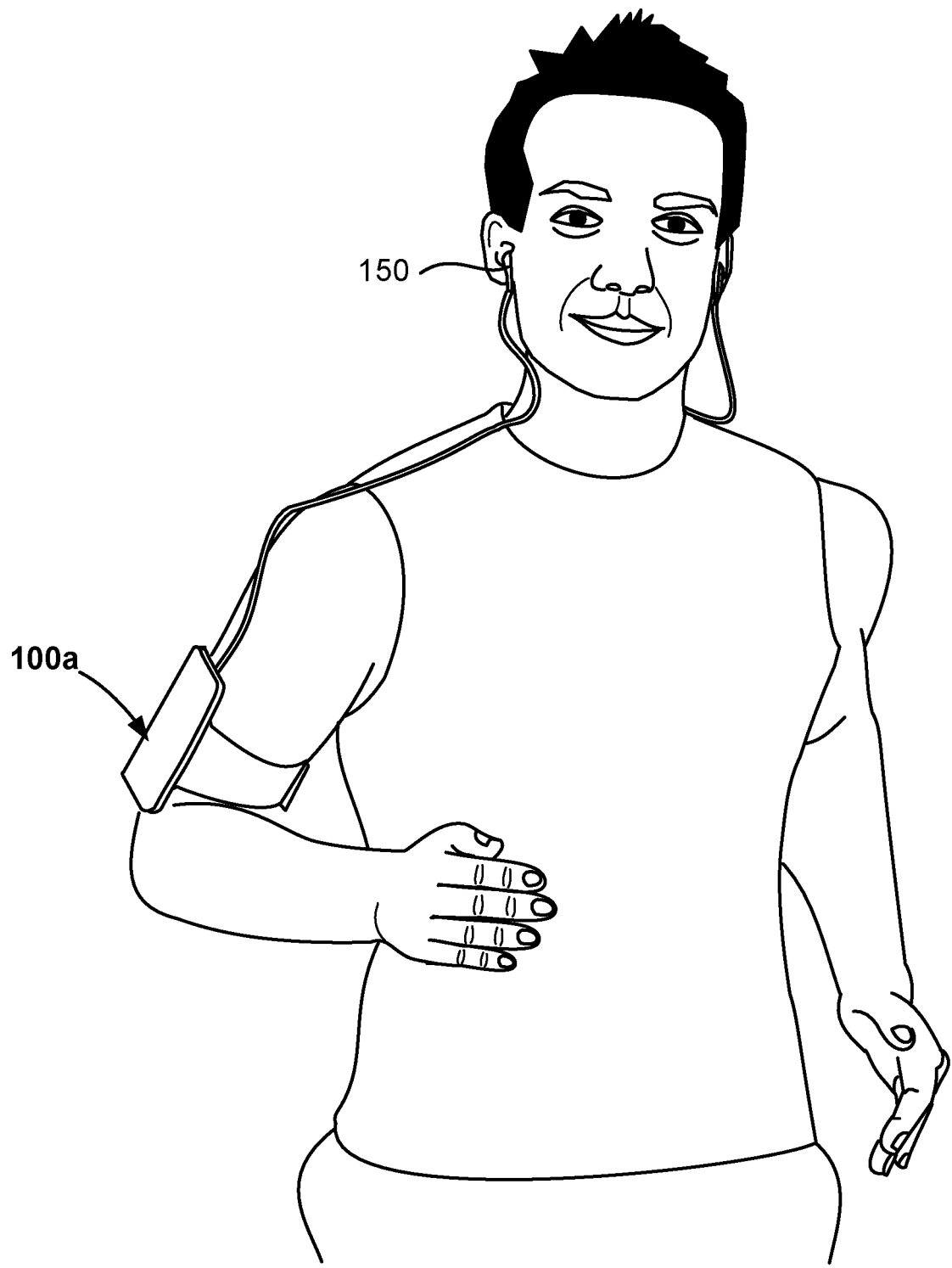
FIG. 1B shows an example in which a speaker system and a control system are in different devices.

However, in some implementations the interface system 105 and the control system 110 may in one device and the microphone system 120, the speaker system 125 and/or the inertial sensor system 130 may be in one or more other devices. FIG. 1B shows an example in which a speaker system and a control system are in different devices. In this example, the speaker system 125 includes earbuds 150 and the control system is in a smart phone 100a that is attached to a user's arm. Accordingly, the smart phone is an instance of the apparatus 100 shown in FIG. 1A. In alternative examples, some of which are described below, the speaker system 125 may include headphones.

Figure 2:
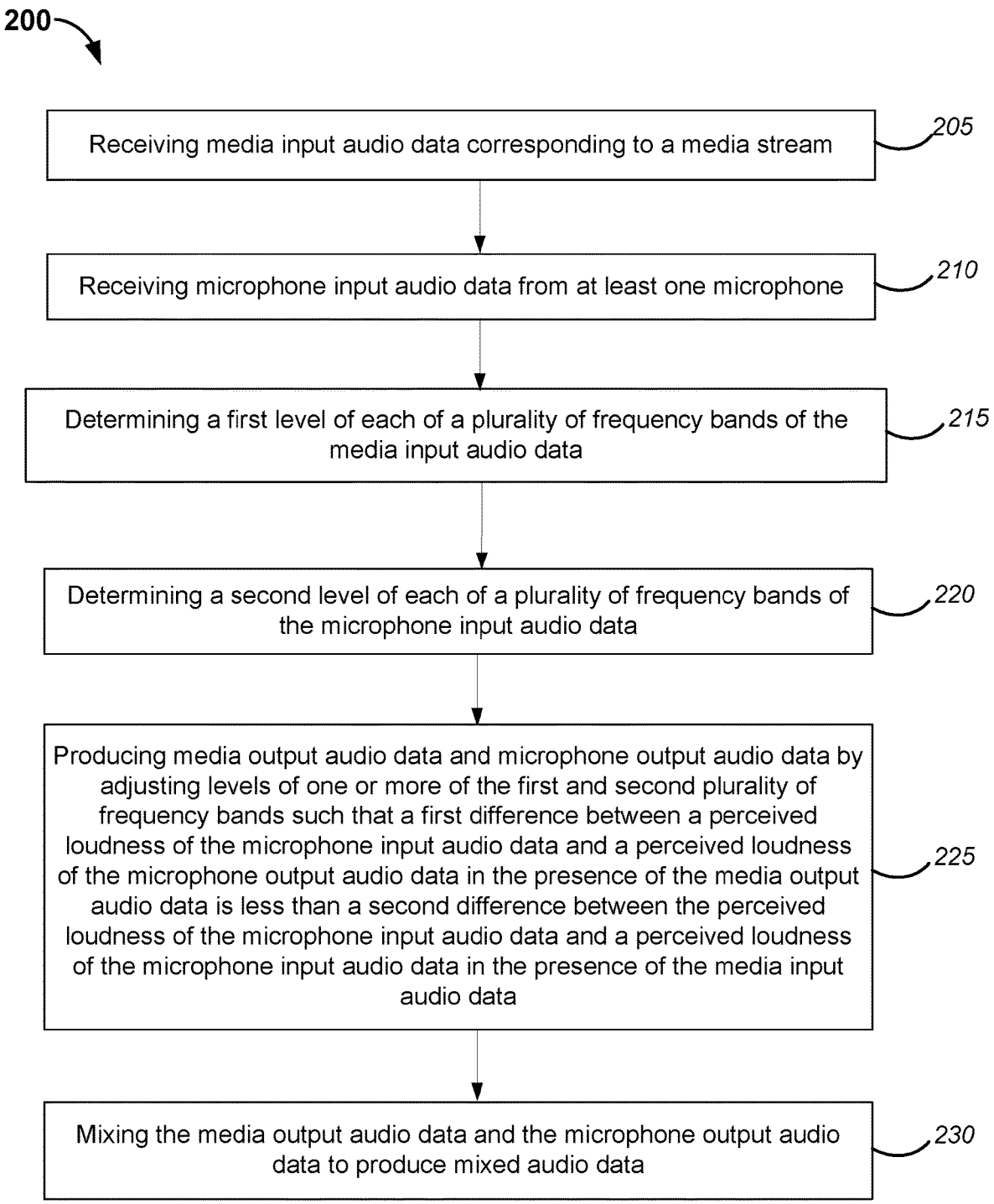
FIG. 2 is a flow diagram that outlines one example of a method that may be performed by an apparatus such as that shown in FIG. 1A or FIG. 1B.

FIG. 2 is a flow diagram that outlines one example of a method that may be performed by an apparatus such as that shown in FIG. 1A or 1B. The blocks of method 200, like other methods described herein, are not necessarily performed in the order indicated. Moreover, such methods may include more or fewer blocks than shown and/or described.

In this example, block 205 of method 200 involves receiving media input audio data corresponding to a media stream. The audio data may, for example, correspond to music, to a television program sound track, to a movie sound track, to a podcast, etc.

Here, block 210 involves receiving microphone input audio data from at least one microphone. According to some implementations, the microphone input audio data may be received from one or more local microphones, so that the microphone input audio data corresponds with sounds from the outside world. In some such examples, a control system block 205 of method 200 involves receive, via an interface system, the media input audio data and the microphone input audio data.

In the example of FIG. 2, block 215 involves determining a first level of each of a plurality of frequency bands of the media input audio data. Here, block 220 involves determining a second level of each of a plurality of frequency bands of the microphone input audio data. The terms "first level" and "second level" are used herein to distinguish levels of frequency bands of the media input audio data from levels of frequency bands of the microphone input audio data. The first levels may or may not be substantially different from the second levels, depending on the particular circumstances. In some examples, blocks 215 and 220 may involve making a transformation from the time domain to the frequency domain. However, in alternative examples, the received media input audio data and/or the received microphone input audio data may already have been transformed from the time domain to the frequency domain.

In this implementation, block 225 involves producing media output audio data and microphone output audio data by adjusting levels of one or more of the first and second plurality of frequency bands. According to this example, the levels are adjusted based, at least in part, on perceived loudness. In particular, some examples involve adjusting levels of one or more of the first and second plurality of frequency bands such that a first difference between a perceived loudness of the microphone input audio data and a perceived loudness of the microphone output audio data in the presence of the media output audio data is less than a second difference between the perceived loudness of the microphone input audio data and a perceived loudness of the microphone input audio data in the presence of the media input audio data. Some detailed examples are described below.

Here, block 230 involves mixing the media output audio data and the microphone output audio data to produce mixed audio data. The mixed audio data may, for example, be provided to speakers of an audio device, such as a headset or earbuds.

In some examples, the adjusting process may involve only boosting the levels of a plurality of frequency bands of the microphone input audio data. Some such examples may involve temporarily boosting only the levels of a plurality of frequency bands of the microphone input audio data. However, in some implementations the adjusting may involve both boosting the levels of a plurality of frequency bands of the microphone input audio data and attenuating the levels of a plurality of frequency bands of the media input audio data.

In some instances, the perceived loudness of the microphone output audio data in the presence of the media output audio data may be substantially equal to the perceived loudness of the microphone input audio data. According to some implementations, a total loudness of the media and microphone output audio data may be in a range between the total loudness of the media and microphone input audio data and the total loudness of the media and microphone audio data produced by only boosting the microphone signal. Alternatively, the total loudness of the media and microphone output audio data may be equal to the total loudness of the media and microphone input audio data, or may be equal to the total loudness of the media and microphone audio data produced by only boosting the microphone signal.

According to some implementations, a loudness model is defined by a specific loudness function $L\{\cdot\}$ which operates on an excitation signal E. The excitation signal, which varies across both frequency and time, is meant to represent the time-varying distribution of energy induced along the basilar membrane of the ear by the audio signal of interest. In practice, the excitation is computed through filterbank analysis which breaks the signal up into discrete frequency bands b with each band signal varying across time t. Ideally, though not required, the spacing of these bands across frequency may be commensurate with a perceptual frequency scale such as the ERB (Equivalent Rectangular Bandwidth). Representing this filterbank analysis by the function $FB\{\cdot\}$, multi-band versions of the input media and microphone signals, $x_{med}(t)$ and $x_{mic}(t)$, may be generated, e.g., as shown in Equations 1a and 1b:

$$X_{med}(b,t)=FB\{x_{med}(t)\} \tag{1a}$$

$$X_{mic}(b,t)=FB\{x_{mic}(t)\} \tag{1b}$$

In Equation 1a, $X_{med}(b,t)$ represents a multi-band version of the input media signals. In Equation 1b, $X_{mic}(b,t)$ represents a multi-band version of the input microphone signals. In some examples, block 205 of FIG. 2 may involve receiving a time-domain version of the input media signals such as $x_{med}(t)$, and block 210 may involve receiving a time-domain version of the input microphone signals such as $x_{mic}(t)$. However, in alternative examples, block 205 of FIG. 2 may involve receiving a multi-band version of the input media signals such as $X_{med}(b,t)$ and block 210 may involve receiving a multi-band version of the input microphone signals such as $X_{mic}(b,t)$.

According to some implementations, the excitation functions of the media and microphone signals are computed next. In some such examples, the excitations of the media and microphone signals may be computed as the time-smoothed power of the multiband signals with a frequency-variant perceptual weighting W(b) applied, e.g., as shown in Equations 2a and 2b:

$$E_{med}(b,t)=\lambda E_{med}(b,t-1)+(1-\lambda)W(b)|X_{med}(b,t)|^2 \tag{2a}$$

$$E_{mic}(b,t)=\lambda E_{mic}(b,t-1)+(1-\lambda)W(b)|X_{mic}(b,t)|^2 \tag{2a}$$

In some implementations, W(b) may take into account the transfer function of headphones, the outer ear, and the middle ear. In Equation 2a, $E_{med}(b,t)$ represents the excitation of the media signal and in Equation 2b, $E_{mic}(b,t)$ represents the excitation of the microphone signal. Equations 2a and 2b involve simple one-pole smoothing functions parametrized by the smoothing coefficient $\lambda$, but other smoothing filters are possible. Equation 2a provides one example of the process of block 215 of FIG. 2, whereas Equation 2b provides one example of the process of block 220.

With the excitation signals generated, the specific loudness function $L\{\cdot\}$ may be applied to yield the specific loudness of the media and microphone, e.g., as shown in Equations 3a and 3b:

$$L_{med}(b,t)=L\{E_{med}(b,t)\} \tag{3a}$$

$$L_{mic}(b,t)=L\{E_{mic}(b,t)\} \tag{3b}$$

In Equation 3a, $L_{med}(b,t)$ represents a specific loudness function corresponding to the media signal and in Equation 3b, $L_{mic}(b,t)$ represents a specific loudness function corresponding to the microphone signal. The specific loudness function models various non-linearities in a human's perception of loudness, and the resulting specific loudness signal describes a time-varying distribution of perceived loudness across frequency. Accordingly, the specific loudness function $L_{mic}(b,t)$ provides one example of the "perceived loudness of the microphone input audio data" that is described above with reference to block 225 of FIG. 2.

These specific loudness signals for the media and microphone audio data represent the perceived loudness of the media stream and the sounds from the microphone when each is heard in isolation. When the two signals are mixed, however, masking may occur. In particular, if one signal is much louder than the other, it will mask the softer signal thereby decreasing the perceived loudness of that softer signal relative to the perceived loudness of that softer signal heard in isolation.

This masking phenomenon may be modeled with a partial loudness function $PL\{\cdot,\cdot\}$ which takes two inputs. The first input is the excitation of a signal of interest, and the second input is the excitation of a competing signal. The partial loudness function returns a partial specific loudness signal PL representing the perceived loudness of the signal of interest in the presence of the competing signal. If the excitation of the competing signal is zero, the partial specific loudness of the signal of interest is equal to its specific loudness, PL=L. As the excitation of the interfering signal grows, PL decreases below L due to masking. However, in order for this reduction to be significant, the level of the competing signal excitation must be close to or larger than the excitation of the signal of interest. If the excitation of the signal of interest is significantly larger than the competing signal excitation, then the partial specific loudness of the signal of interest is approximately equal to its specific loudness, $PL \cong L$.

For the purposes of maintaining audibility of the microphone signal in the presence of the media signal, we may consider the microphone as the signal of interest and the media as the competing signal. With this designation, the partial specific loudness of the microphone may be computed from the excitation of the microphone and the media, e.g. as shown in Equation 4:

$$PL_{mic}(b,t)=PL\{E_{mic}(b,t),E_{med}(b,t)\} \tag{4}$$

In general, the partial specific loudness of the microphone in the presence of the media, $PL_{mic}(b,t)$, is smaller than its isolated specific loudness, $L_{mic}(b,t)$. To maintain audibility of the microphone signal when mixed with the media, the microphone and media signals may be processed such that the partial specific loudness of the processed microphone signal in the presence of the processed media signal is closer to $L_{mic}$(b,t), which represents the audibility of the microphone signal in isolation. Specifically, frequency and time-varying microphone and media processing gains, $G_{mic}$(b,t) and $G_{med}$(b,t), may be computed such that the difference between the microphone specific loudness $L_{mic}$(b,t) and the processed microphone partial specific loudness $\overline{PL}_{mic}$(b,t) is less than the difference between microphone specific loudness $L_{mic}$(b,t) and the unprocessed microphone partial specific loudness $PL_{mic}$(b,t):

$$\overline{PL}_{mic}(b,t)=PL\{G_{mic}^2(b,t)E_{mic}(b,t),G_{med}^2(b,t)E_{med}(b,t)\} \quad (5a)$$

such that:

$$L_{mic}[b,t]-\overline{PL}_{mic}[b,t]<L_{mic}[b,t]-PL_{mic}[b,t] \quad (5b)$$

The expression $L_{mic}[b,t]-\overline{PL}_{mic}[b,t]$ in Equation 5b provides one example of the "first difference between a perceived loudness of the microphone input audio data and a perceived loudness of the microphone output audio data in the presence of the media output audio data" described above with reference to block 225 of FIG. 2. Similarly, the expression $L_{mic}[b,t]-PL_{mic}[b,t]$ in Equation 5b provides one example of the "second difference between the perceived loudness of the microphone input audio data and a perceived loudness of the microphone input audio data in the presence of the media input audio data" described above with reference to block 225 of FIG. 2.

Once these gains are computed, the processed media and microphone signals may be generated by applying a synthesis filterbank or an inverse transform to the corresponding gain modified filterbank signals, e.g., as shown below:

$$y_{med}(t)=FB^{-1}\{G_{med}(b,t)X_{med}(b,t)\} \quad (6a)$$

$$y_{mic}(t)=FB^{-1}\{G_{mic}(b,t)X_{mic}(b,t)\} \quad (6b)$$

The expression $y_{med}(t)$ of Equation 6a provides one example of the "media output audio data" that is described above with reference to block 225 of FIG. 2. Likewise, the expression $y_{mic}(t)$ of Equation 6b provides one example of the "microphone output audio data" that is described above with reference to block 225 of FIG. 2.

In some examples, the final output signal may be produced by mixing the processed media and microphone signals:

$$y(t)=y_{med}(t)+y_{mic}(t) \quad (7)$$

Accordingly, Equation 7 provides one example of "mixing the media output audio data and the microphone output audio data to produce mixed audio data" that is described above with reference to block 230 of FIG. 2.

In order to compute the required microphone and media processing gains, it may be useful to define an inverse partial specific loudness function which returns the excitation of a signal of interest corresponding to a particular partial specific loudness of the signal of interest in the presence of a competing signal excitation, e.g.:

$$PL^{-1}\{PL_{int},E_{comp}\}=E_{int} \quad (8a)$$

such that $$PL_{int}=PL\{E_{int},E_{comp}\} \quad (8b)$$

In Equations 8a and 8b, $PL^{-1}$ represents an inverse partial specific loudness function, $PL_{int}$ represents a partial specific loudness of a signal of interest, Ent represents the excitation of a signal of interest and $E_{comp}$ represents the excitation of a competing signal.

One example of a solution for meeting the general objective of the implementation described by Equations 5 is to equate the processed microphone partial specific loudness to the specific loudness of the microphone in isolation, e.g., as shown below:

$$\overline{PL}_{mic}(b,t)=L_{mic}(b,t) \quad (9)$$

Setting this condition stipulates that the loudness of the processed microphone in the presence of the processed media is the same as the loudness of the original unprocessed microphone on its own. In other words, the perceived loudness of the microphone should remain consistent, regardless of the media signal playing. Substituting Equation 9 and Equation 3b into Equation 5a and using the definition of inverse partial specific loudness given in Equations 8a and 8b yields a corresponding solution for the microphone processing gains $G_{mic}$(b,t):

$$G_{mic}(b, t) = \sqrt{\frac{PL^{-1}\{L\{E_{mic}(b, t)\}, G_{med}(b, t)E_{med}(b, t)\}}{E_{mic}(b, t)}} \quad (10)$$

Imposing the constraint that the media signal remains unprocessed, meaning $G_{med}$(b,t)=1, yields a unique solution to the microphone processing gains which is computed from the known microphone and media excitation signals as seen in (10). This particular solution can involve boosting only the microphone signal to maintain its perceived loudness, while leaving the media signal alone. As such, this solution for the microphone gains is referred to as $G_{boost}$(b,t).

While the solution $G_{boost}$(b,t) does maintain audibility of the microphone signal above the media, in practice the sound of the combined processed microphone and media may become too loud or unnatural-sounding. To avoid this it may be desirable to impose a different constraint on Equation 10 to yield a unique solution to the microphone and media gains. One such alternative is to constrain the total loudness of the mixture to be equal to some target. The total loudness of the unprocessed microphone and media mixture $L_{tot}$(b,t) may be given by the loudness function applied to the sum of the microphone and media excitations:

$$L_{tot}(b,t)=L\{E_{mic}(b,t)+E_{med}(b,t)\} \quad (11a)$$

The total loudness of the processed mixture of media output audio data and microphone output audio data $\overline{L}_{tot}$(b,t) may be defined in a similar manner:

$$\overline{L}_{tot}(b,t)=L\{G_{mic}^2(b,t)E_{mic}(b,t)+G_{med}^2(b,t)E_{med}(b,t)\}, \quad (11b)$$

The total loudness of the boost-only solution may be expressed as follows:

$$\overline{L}_{boost}(b,t)=L\{G_{boost}^2(b,t)E_{mic}(b,t)+E_{med}(b,t)\} \quad (11c)$$

To reduce the overall loudness of the processed mixture, one may specify that the total loudness of the processed mixture lie somewhere in between the total loudness of the boost-only solution and the total loudness of the unprocessed mixture, e.g. as follows:

$$\overline{L}_{tot}(b,t)=\alpha\overline{L}_{boost}(b,t)+(1-\alpha)L_{tot}(b,t) \quad (12)$$

Combining Equation 12 with Equation 10 specifies a unique solution for both the microphone and media gains. When $\alpha=1$, the resulting solution is equivalent to the boost-only solution, and when $\alpha=0$ the total loudness of the mixture stays the same as the unprocessed mixture by additionally attenuating the media signal. When $\alpha$ lies between one and zero, the total loudness of the mixtures lies somewhere between these two extremes. Regardless, the application of Equation 10 guarantees that the partial loudness of the processed microphone signal remains equal to the loudness of the microphone signal alone, thereby maintaining its audibility in the presence of the media signal.

Conventional audio devices such as headphones and earbuds typically have one working mode, a media playback mode, in which the media input audio data from a laptop, computer, mobile phone, mobile audio player, or tablet is reproduced to the ear drum of the user. In some examples, such a media playback mode may use active noise cancelling technique to eliminate, or at least reduce, interference from ambient sounds or background noise.

Some audio methods disclosed herein may involve an additional mode, such as a pass-through mode. Some such pass-through modes are described above. In some pass-through mode examples, the media audio signals may be reduced in volume or silenced, and the conversation between the user and other people (or other external sounds of interest to the user) may be captured by the microphones of an audio device, such as headphones or earbuds, and mixed into the output audio for playback. In some such implementations, a user may be able to take part in a conversation without having to stop the media play back and/or remove an audio device from the user's ear(s). Accordingly, some such modes may be referred to herein as "conversation modes." In some examples, a user may give a command, e.g., via a user interface of an interface system 105 described above, in order to change the operational mode to a conversation mode. Such a command is one example of a "mode-switching indication" as described herein.

However, other types of operational mode switching for audio devices are disclosed herein. According to some such implementations, mode-switching may not require user input, but may instead be automatic. One or more types of audio processing may be modified upon receipt of a mode-switching indication. According to some such examples, one or more of the receiving, determining, producing or mixing process described above with reference to FIG. 2 may be modified according to the mode-switching indication. In some examples, the modification may involve increasing a relative loudness of the microphone output audio data, relative to a loudness of the media output audio data. For example, the modification may involve increasing the relative loudness of the microphone output audio data by suppressing the media input audio data or pausing the media stream.

Various types of mode-switching indications are contemplated by the inventors. In some examples, the mode-switching indication may be based, at least in part, on an indication of a head movement. Alternatively, or additionally the mode-switching indication may be based, at least in part, on an indication of an eye movement. In some examples, the head movement may be detected by an inertial sensor system. Accordingly, in some implementations a mode-switching indication may be based, at least in part, on inertial sensor data from an inertial sensor system. The inertial sensor data may indicate movement of a headset, e.g., movement of headphones being worn by a user.

Figure 3:
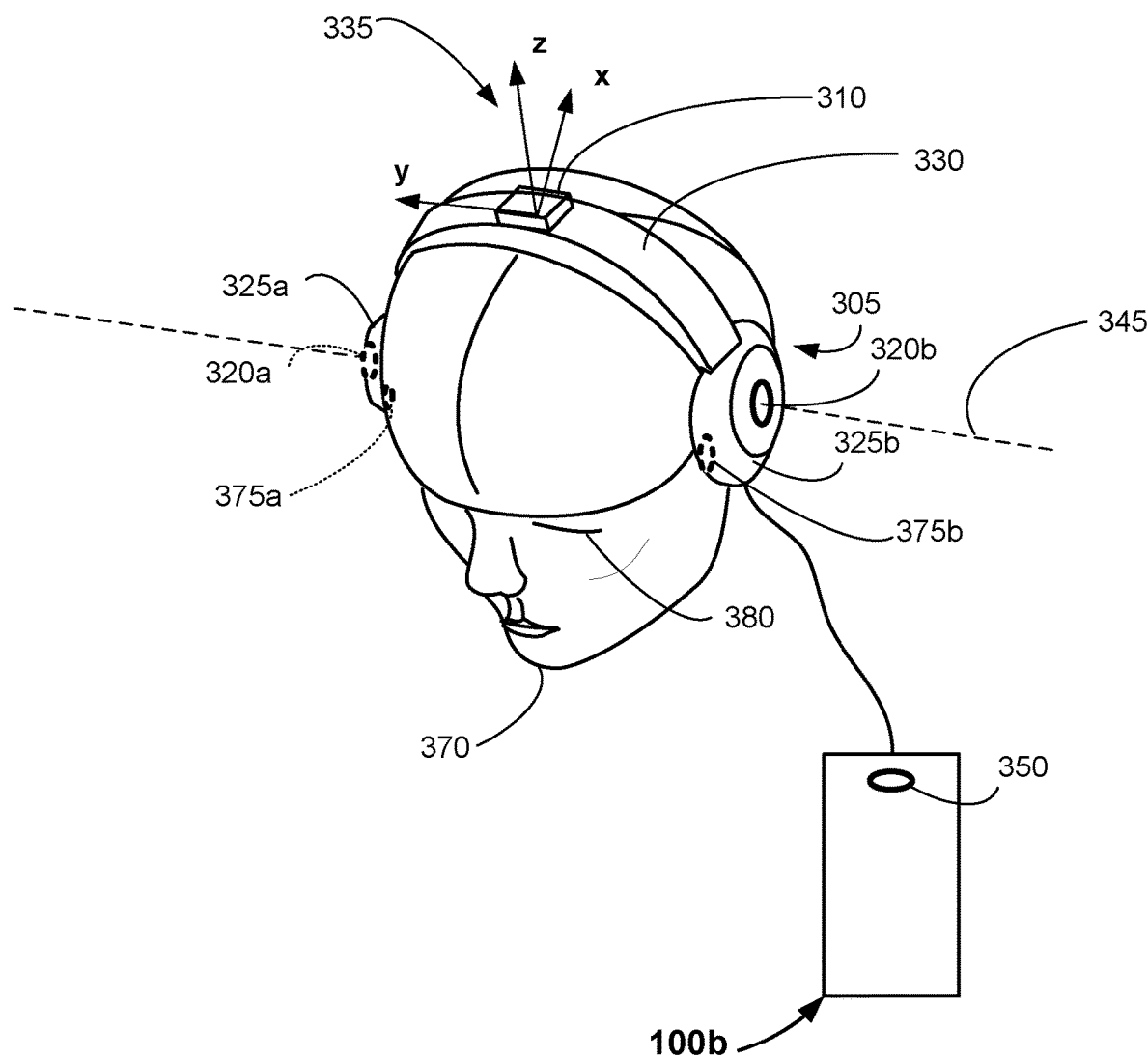
FIG. 3 shows an example of an audio device that includes an inertial sensor system.

FIG. 3 shows an example of an audio device that includes an inertial sensor system. In this example, the audio device is a headset 305. The inertial sensor system 310 includes one or more inertial sensor devices, such as one or more gyroscopes, one or more accelerometers, etc. The inertial sensor system 310 is capable of providing inertial sensor data to a control system. In this example, at least a portion of the control system is a component of the apparatus 100b, which is an example of the apparatus 100 that is described elsewhere herein. Alternatively, or additionally, at least a portion of the control system may be a component of an audio device, such as the headset 305. The inertial sensor data can indicate movements of the headset 305 and therefore can indicate movements of a user's head when the user is wearing the headset 305.

In the example shown in FIG. 3, the apparatus 100b includes a camera system with at least one camera 350. In some examples, the camera system may include two or more cameras. In some implementations, a control system (e.g., of the apparatus 100b) may be able to determine a user's eye movements and/or a direction in which a user is currently looking based, at least in part, on camera data from a camera system. Alternatively, or additionally, the control system may be able to determine a user's eye movements according to electroencephalogram data. Such electroencephalogram data may, for example, be received from an electroencephalogram system of the headset 305. In some implementations, the headset 305 (or another audio device, such as earbuds) may include one or more EEG electrodes that are configured to be positioned in a user's ear canal and/or on the user's scalp. A user's eye movements may be determined via analysis of an EEG signal from the one or more EEG electrodes.

In this example, the headset 305 includes headphone units 325a and 325b, each of which includes one or more speakers of a speaker system 125. In some examples, each of the headphone units 325a and 325b may include one or more EEG electrodes. According to some such examples, each of the headphone units 325a and 325b may include at least one EEG electrode on a front side, so that the EEG electrode may be positioned near to the eyes of the user 370 when the headset 305 is worn. In the example of FIG. 3, an EEG electrode 375a of the headphone unit 325a may be positioned near a right eye of the user 370 and the EEG electrode 375b of the headphone unit 325b may be positioned near the left eye 380 when the headset 305 is worn. In some such implementations, a potential difference between the EEG electrode 375a and the EEG electrode 375b may be used to detect eye movements. In this example, the headphone units 325a and 325b also include microphones 320a and 320b. In some examples, a control system of the apparatus 100b or the headset 305 may be capable of determining a direction of a sound source based, at least in part, on microphone data from two or more microphones, such as the microphones 320a and 320b. According to some such examples, the control system may be capable of determining, based at least in part on an intensity difference between a first microphone audio signal from the microphone 320a and a second microphone audio signal from the microphone 320b, a direction corresponding to a sound source location. In some examples the "intensity difference" may be, or may correspond with, a ratio of intensities, or levels, between the first microphone audio signals and the second microphone audio signals.

Alternatively, or additionally, the control system may be capable of determining, based at least in part on a time difference between a first microphone audio signal from the microphone 320a and a second microphone audio signal from the microphone 320b, a direction corresponding to a sound source location. Some examples of determining an azimuthal angle corresponding to a sound source location and of determining an elevation angle corresponding to a sound source location are provided below.

In some examples, the control system may be capable of determining whether the direction of the sound source corresponds with a head movement or an eye movement. Such implementations are potentially advantageous, because this combination of events suggest that user's attention has momentarily shifted from the content of the media stream to an event of interest in the real world. For example, there may be some audibility of ambient sounds to the user, either by actively passing through ambient sound via microphone input audio data, or due to the passive leakage of the ambient sound due to incomplete sound occlusion provided by the headset 305. In some instances, the user may be able to determine that there is activity indicated by the ambient sounds, but the ambient sounds may not be intelligible enough to carry on a conversation without mode-switching or removing the headset 305. Based on this ambient sound and/or on visual information, the user often can judge if there is an event that needs his/her attention. If so, a natural reaction of the user would be to turn his or her head and/or to cast a glance towards the direction of a sound source. Particularly if an audio event from a particular direction is followed by an immediate, or nearly immediate, head rotation towards the direction of the sound event, it is reasonable to assume that the audio event corresponds with an event of interest.

Accordingly, in some implementations in which the control system is capable of determining whether the direction of a sound source corresponds with a head movement or an eye movement, such a determination will be an example of a mode-switching indication. In some examples, the control system may modify at least one of the receiving, determining, producing or mixing process (described above with reference to FIG. 2) based, at least in part, on the mode-switching indication. For example, the control system may increase a relative loudness of the microphone output audio data, relative to a loudness of the media output audio data. In some such examples, increasing the relative loudness of the microphone output audio data may involve suppressing the media input audio data or pausing the media stream.

For the sake of computational simplicity, it can be advantageous to have some correspondence between the orientation of a microphone system and the orientation of an inertial sensor system. In the example shown in FIG. 3, the microphones 320a and 320b are aligned parallel to one axis of a coordinate system 335 of the inertial sensor system 310. In this example, the axis 345 passes through the microphones 320a and 320b. Here, the y axis of the coordinate system 335 is aligned with the headband 330 and is parallel to the axis 345. In this example, the z axis of the headset coordinate system 905a is aligned vertically, relative to the top of the headband 330 and the top of the inertial sensor system 310. In this implementation, the coordinate system 335 is an x, y, z coordinate system, but other implementations may use another coordinate system, such as a polar, spherical or cylindrical coordinate system.

Other types of mode-switching may be based, at least on part, on a direction of movement of a sound source. If it is determined that a sound source is moving towards the user, this could be important for safety reasons. Examples include approaching car noise, foot step sounds, yelling from running people, etc.

Accordingly, some implementations may involve determining a movement direction of a sound source based, at least in part, on microphone data from two or more microphones (such as the microphones 320a and 320b shown in FIG. 3). Such implementations may involve determining whether there is a mode-switching indication based, at least in part, on the movement direction of the sound source. If the movement direction is towards one or more of the microphones of a device in the user's possession, this is an indication that an object producing the sound is moving towards the user. For example, a movement direction towards the user may be determined according to an increase in the apparent volume of the sound source as the sound source approaches the microphones. Therefore, some implementations may involve determining a mode-switching indication based, at least in part, on a determination that the movement direction of the sound source is towards at least one of the microphones.

If the sound source is approaching the user and is moving above a predetermined speed, this could be even more significant in terms of potential danger to the user. Accordingly, some implementations may involve determining a velocity of the sound source and determining a mode-switching indication based, at least in part, on a determination that the velocity of the sound source exceeds a threshold. For example, the speed of an approaching sound source, such as a car, can be determined by measuring the volume change of the car noise and comparing it with a cubic power increase curve, since the power increases as the cube of the decrease in distance between a sound source and a microphone.

Some mode-switching implementations may involve identifying a person of interest to the user. In some examples, the person of interest may be identified indirectly, e.g., according to a direction of a sound source that corresponds with a current location of the person of interest. The direction of the sound source may, in some instances, correspond with a position adjacent to the user, where the person of interest is located. For example, for the use case of in-cabin movie playing, a user's selected sound source direction may correspond with a seat to the right or to the left of the user, where the user's friend is sitting. A control system may be capable of determining an instance when a sound is received from the selected sound source direction and of identifying such an instance as a mode-switching indication. According to some such examples, the control system may be capable of controlling an audio device, such as headphones, to pass through a sound from the selected sound source direction, while sounds from other directions will not be passed through.

Therefore, some implementations may involve receiving an indication from a user of a selected sound source direction. Such implementations may involve determining a direction of a sound source based, at least in part, on microphone data from two or more microphones. Some such implementations may involve determining that the location of the sound source is a mode-switching indication if the location of the sound source corresponds with the selected sound source direction.

Some mode-switching implementations may involve speech recognition of the microphone input audio data and/or identifying keywords based on microphone input audio data that is recognized as speech. For example, predetermined keywords may be mode-switching indications. Such keywords may, for example, correspond with emergency situations, potential danger to the user, etc., such as "Help!" or "Watch out!"

Some mode-switching implementations may involve a process of classifying the microphone input audio data and basing a mode-switching indication, at least in part, on the classification. Some such mode-switching implementations may involve recognizing the voice of a person of interest to the user, which also may be referred to herein as a pre-selected person's voice. Alternatively, or additionally, the classification may involve determining whether the microphone input audio data indicates another sound of potential consequence to the user, such as a car horn, an approaching vehicle sound, a scream, a yell, a pre-selected person's voice, a pre-selected key word and/or a public announcement.

Figure 4:
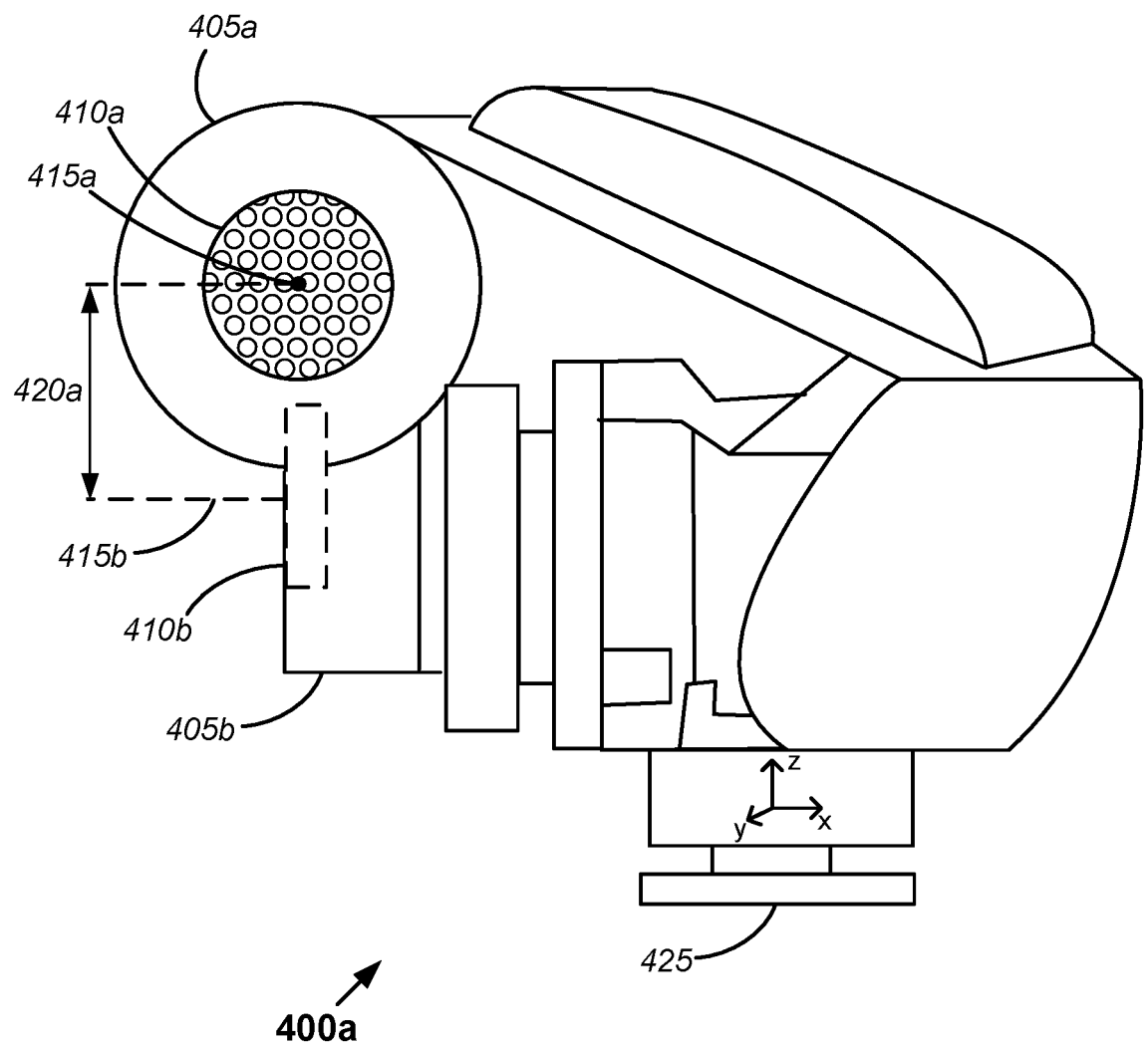
FIG. 4 shows one example of a microphone system that includes a pair of coincident, vertically-stacked directional microphones.

Although the microphone arrangement shown in FIG. 3 could provide satisfactory results, other implementations may include other microphone arrangements. FIG. 4 shows one example of a microphone system that includes a pair of coincident, vertically-stacked directional microphones. In this example, the microphone system 400a includes an XY stereo microphone system that has vertically-stacked microphones 405a and 405b, each of which includes a microphone capsule. Having a known vertical offset between the microphones 405a and 405b is potentially advantageous, because it allows for the detection of time differences between the arrivals of corresponding audio signals. Such time differences may be used to determine an elevation angle of a sound source, e.g., as described below.

In this implementation, the microphone 405a includes the microphone capsule 410a and the microphone 405b includes the microphone capsule 410b, which is not visible in FIG. 4 due to the orientation of the microphone 405b. The longitudinal axis 415a of the microphone capsule 410a extends in and out of the page in this example.

In the example shown in FIG. 4, an xyz coordinate system is shown relative to the microphone system 400a. In this example, the z axis of the coordinate system is a vertical axis. Accordingly, in this example the vertical offset 420a between the longitudinal axis 415a of the microphone capsule 410a and the longitudinal axis 415b of the microphone capsule 410b extends along the z axis. However, the orientation of the xyz coordinate system that is shown in FIG. 4 and the orientations of other coordinate systems disclosed herein are merely shown by way of example. In other implementations, the x or y axis may be a vertical axis. In still other implementations, a cylindrical or spherical coordinate system may be referenced instead of an xyz coordinate system.

In this implementation, the microphone system 400a is capable of being attached to a second device, such as a headset, a smart phone, etc. In some examples, the coordinate system of the microphone system 400a may be coincident with the coordinate system of an inertial sensor system, such as the inertial sensor system 310 shown in FIG. 3. Here, the mount 425 is configured for coupling with the second device. In this example, an electrical connection may be made between the microphone system 400a and the second device after the microphone system 400a is physically connected with the second device via the mount 525. Accordingly, audio data corresponding to sounds captured by the microphone system 400a may be conveyed to the second device for storage, further processing, reproduction, etc.

Figure 5:
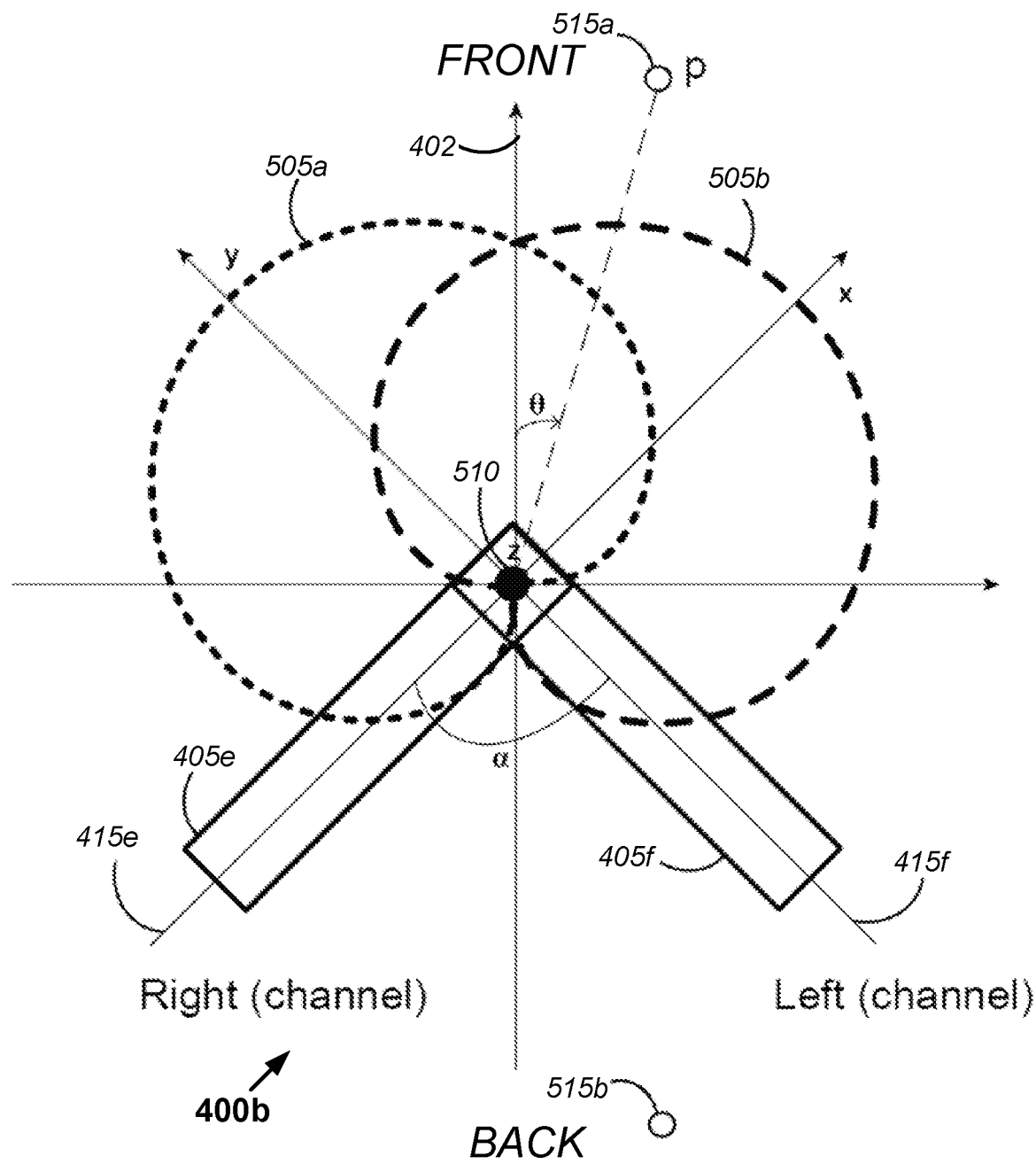
FIG. 5 shows another example of a microphone system that includes a pair of coincident, vertically-stacked directional microphones.

FIG. 5 shows another example of a microphone system that includes a pair of coincident, vertically-stacked directional microphones. The microphone system 400b includes vertically-stacked microphones 405e and 405f, each of which includes a microphone capsule that is not visible in FIG. 5: the microphone 405e includes the microphone capsule 410e and the microphone 405f includes the microphone capsule 410f. In this example, the longitudinal axis 415e of the microphone capsule 410e and the longitudinal axis 415f of the microphone capsule 410f extend in the x,y plane.

Here, the z axis extends in and out of the page. In this example, the z axis passes through the intersection point 410 of the longitudinal axis 415e and the longitudinal axis 415f. This geometric relationship is one example of the microphones of microphone system 400b being "coincident." The longitudinal axis 415e and the longitudinal axis 415f are vertically offset along the z axis, although this offset is not visible in FIG. 5. The longitudinal axis 415e and the longitudinal axis 415f are separated by an angle α, which may be 90 degrees, 120 degrees or another angle, depending on the particular implementation.

In this example, the microphone 405e and the microphone 405f are directional microphones. A microphone's degree of directionality may be represented by a "polar pattern," which indicates how sensitive the microphone is to sounds arriving at different angles relative a microphone's longitudinal axis. The polar patterns 405a and 405b illustrated in FIG. 5 represent the loci of points that produce the same signal level output in the microphone if a given sound pressure level (SPL) is generated from that point. In this example, the polar patterns 405a and 405b are cardioid polar patterns. In alternative implementations, a microphone system may include coincident, vertically-stacked microphones having supercardioid or hypercardioid polar patterns, or other polar patterns.

The directionality of microphones may sometimes be used herein to reference a "front" area and a "back" area. The sound source 415a shown in FIG. 5 is located in an area that will be referred to herein as a front area, because the sound source 415a is located in an area in which the microphones are relatively more sensitive, as indicated by the greater extension of the polar patterns along the longitudinal axes 415e and 415f. The sound source 415b is located in an area that will be referred to herein as a back area, because it is an area in which the microphones are relatively less sensitive.

Determination of the azimuthal angle θ corresponding with a sound source direction may be based, at least in part, on differences in sound pressure level (which also may be referred to herein as differences in intensity or amplitude) between the sound captured by the microphone capsule 410e and sound captured by the microphone capsule 410f. Some examples are described below.

Figure 6:
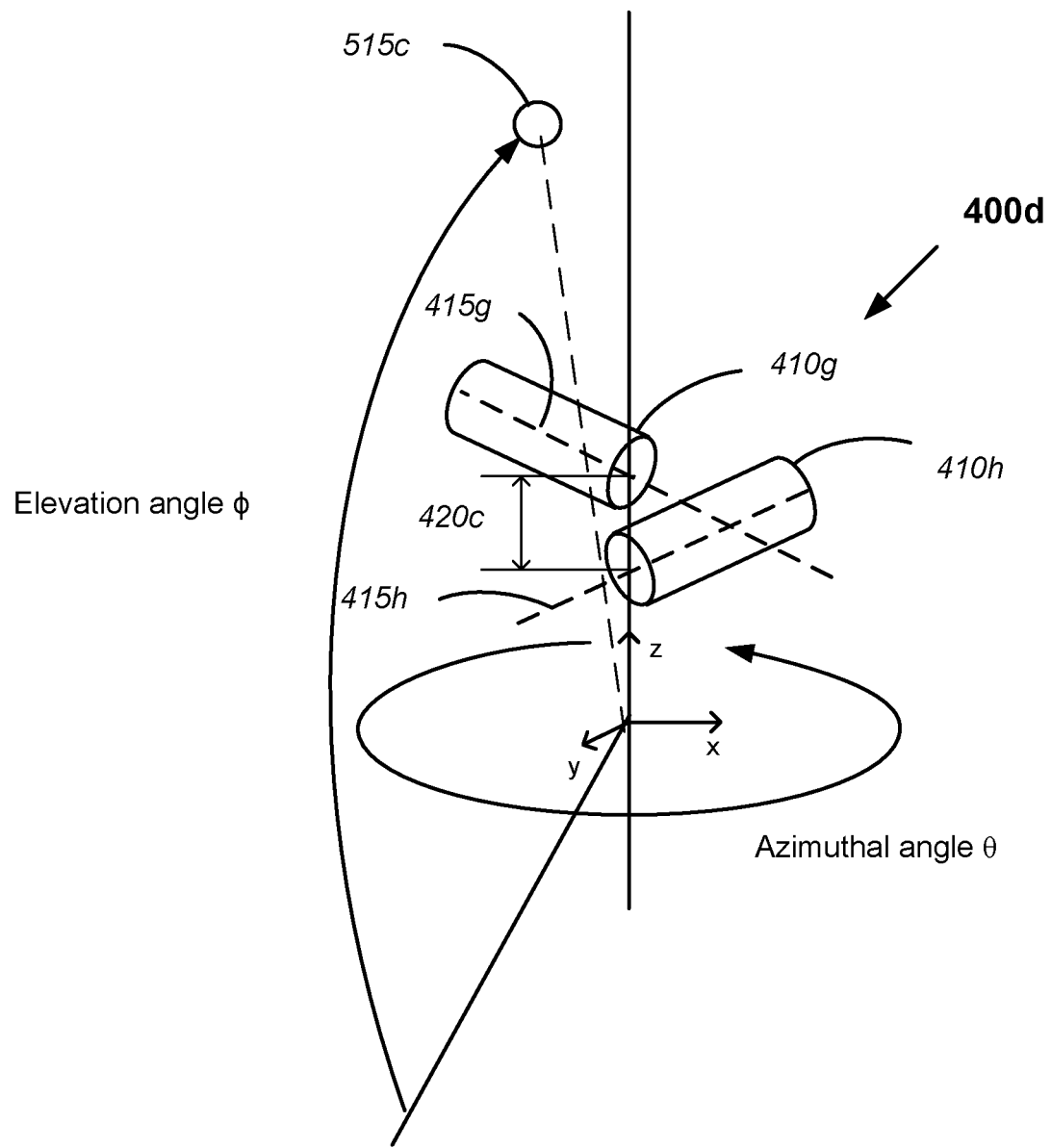
FIG. 6 shows an example of azimuthal angles and elevation angles relative to a microphone system that includes pair of coincident, vertically-stacked directional microphones.

FIG. 6 shows an example of azimuthal angles and elevation angles relative to a microphone system that includes pair of coincident, vertically-stacked directional microphones. For the sake of simplicity, only the microphone capsules 410g and 410h of the microphone system 400d are shown in this example, without support structures, electrical connections, etc. Here, the vertical offset 420c between the longitudinal axis 415g of the microphone capsule 410g and the longitudinal axis 415h of the microphone capsule 410h extends along the z axis. The azimuthal angle corresponding to the position of a sound source, such as the sound source 515b, is measured in a plane that is parallel to the x,y plane in this example. This plane may be referenced herein as the "azimuthal plane." Accordingly, the elevation angle is measured in a plane that is perpendicular to the x,y plane in this example.

Figure 7:
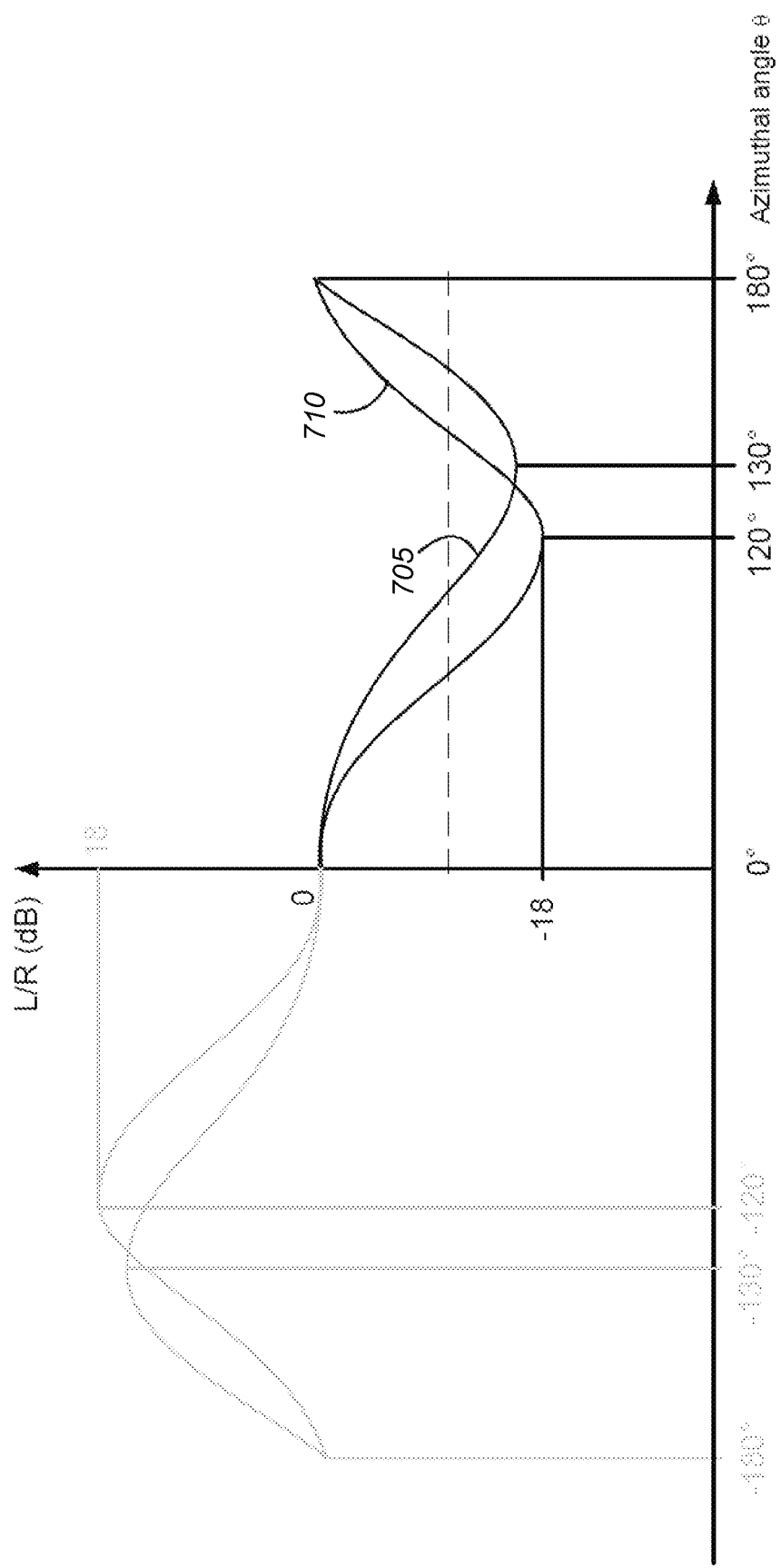
FIG. 7 is a graph that shows examples of curves indicating relationships between an azimuthal angle and a ratio of intensities, or levels, between right and left microphone audio signals (the L/R energy ratio) produced by a pair of coincident, vertically-stacked directional microphones.

FIG. 7 is a graph that shows examples of curves indicating relationships between an azimuthal angle and a ratio of intensities, or levels, between right and left microphone audio signals (the L/R energy ratio) produced by a pair of coincident, vertically-stacked directional microphones. The right and left microphone audio signals are examples of the first and second microphone audio signals referenced elsewhere herein. In this example, the curve 705 corresponds to the relationship between the azimuthal angle and the L/R ratio for signals produced by a pair of coincident, vertically-stacked directional microphones, having longitudinal axes separated by 90 degrees in the azimuthal plane.

Referring to FIG. 5, for example, the longitudinal axes 415e and 415f are separated by an angle α in the azimuthal plane. The sound source 515a shown in FIG. 5 is at an azimuthal angle θ, which is measured from an axis 402 that is midway between the longitudinal axis 415e and the longitudinal axis 415f in this example. The curve 705 corresponds to the relationship between the azimuthal angle and the L/R energy ratio for signals produced by a similar pair of coincident, vertically-stacked directional microphones, wherein a is 90 degrees. The curve 710 corresponds to the relationship between the azimuthal angle and the L/R ratio for signals produced by another pair of coincident, vertically-stacked directional microphones, wherein a is 120 degrees.

It may be observed that in the example shown in FIG. 7, both of the curves 705 and 710 have an inflection point at an azimuthal angle of zero degrees, which in this example corresponds to an azimuthal angle at which a sound source is positioned along an axis that is midway between the longitudinal axis of the left microphone and the longitudinal axis of the right microphone. As shown in FIG. 7, local maxima occur at azimuthal angles of −130 degrees or −120 degrees. In the example shown in FIG. 7, the curves 705 and 710 also have local minima corresponding to azimuthal angles of 130 degrees and 120 degrees, respectively. The positions of these minima depend in part on whether a is 90 degrees or 120 degrees, but also depend on the directivity patterns of the microphones. The positions of the maxima and minima that are shown in FIG. 7 generally correspond with microphone directivity patterns such as those indicated by the polar patterns 505a and 505b shown in FIG. 5. The positions of the maxima and minima would be somewhat different for microphones having different directivity patterns.

Referring again to FIG. 6, it may be seen that the sound source 515c is located above the microphone system 400d, at an elevation angle (p. Because of the vertical offset 420c between the microphone capsule 410g and the microphone capsule 410h, sound emitted by the sound source 515c will arrive at the microphone capsule 410g before arriving at the microphone capsule 410h. Therefore, there will be a temporal difference between the microphone audio signals from the microphone capsule 410g that are responsive to sound from the sound source 515c and the corresponding microphone audio signals from the microphone capsule 410g that are responsive to sound from the sound source 515c.

Accordingly, some implementations may involve determining, based at least in part on a temporal difference between the first microphone audio signals and the second microphone audio signals, an elevation angle corresponding to a sound source location. The elevation angle may be determined according to a vertical distance, also referred to herein as a vertical offset, between a first microphone and a second microphone of the pair of coincident, vertically-stacked directional microphones. According to some implementations, the control system 110 of FIG. 1A may be capable of determining an elevation angle corresponding to the sound source location, based at least in part on a temporal difference between the first microphone audio signals and the second microphone audio signals.

Various modifications to the implementations described in this disclosure may be readily apparent to those having ordinary skill in the art. The general principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

The invention claimed is:

1. A method, comprising:
   receiving media input audio data corresponding to a media stream;
   receiving microphone input audio data from at least one microphone;
   computing a media input excitation function of the media input audio data;
   computing a microphone input excitation function of the microphone input audio data;
   determining, based at least in part on the microphone input excitation function and according to a specific loudness function that models non-linearities in a human's perception of loudness, a microphone input specific loudness of the microphone input audio data, the microphone input specific loudness corresponding with a perceived loudness of the microphone input audio data;
   determining, based at least in part on the media input excitation function and the microphone input excitation function, a microphone partial specific loudness corresponding to the perceived loudness of the microphone input audio data in a presence of the media input audio data;
   determining frequency- and time-varying media processing gains to apply to the media input audio data to produce media output audio data;
   determining frequency- and time-varying microphone processing gains to apply to the microphone input audio data to produce microphone output audio data, wherein the media processing gains and the microphone processing gains are determined such that a first difference between the microphone input specific loudness and a perceived loudness of the microphone output audio data in a presence of the media output audio data is less than a second difference between the microphone input specific loudness and the microphone partial specific loudness;
   applying the determined media processing gains to the media input audio data to produce the media output audio data;
   applying the determined microphone processing gains to the microphone input audio data to produce the microphone output audio data and
   mixing the media output audio data and the microphone output audio data to produce mixed audio data.

2. The method of claim 1, wherein the perceived loudness of the microphone output audio data in the presence of the media output audio data is substantially equal to the perceived loudness of the microphone input audio data.

3. The method of claim 1, wherein applying the determined media processing gains and applying the determined microphone processing gains involve boosting the levels of one or more frequency bands of the microphone input audio data and attenuating the levels of one or more frequency bands of the media input audio data.

4. The method of claim 1, further comprising providing the mixed audio data to speakers of a headset.

5. The method of claim 1, further comprising:
   receiving a mode-switching indication; and modifying at least one of the receiving, determining or mixing process based, at least in part, on the mode-switching indication.

6. The method of claim 5, wherein the modifying involves increasing a relative loudness of the microphone output audio data, relative to a loudness of the media output audio data.

7. The method of claim 6, wherein increasing the relative loudness of the microphone output audio data involves suppressing the media input audio data or pausing the media stream.

8. The method of claim 5, wherein the mode-switching indication is based, at least in part, on at least one of an indication of a head movement or an indication of an eye movement.

9. The method of claim 5, wherein the mode-switching indication is based, at least in part, on inertial sensor data.

10. The method of claim 9, wherein the inertial sensor data corresponds to movement of a headset.

11. One or more non-transitory media having software stored thereon, the software including instructions to control one or more devices for:
receiving media input audio data corresponding to a media stream;
receiving microphone input audio data from at least one microphone;
computing a media input excitation function of the media input audio data as a time-smoothed power of the media input audio data with a frequency-variant perceptual weighting;
computing a microphone input excitation function of the microphone input audio data as a time-smoothed power of the microphone input audio data with a frequency-variant perceptual weighting;
determining, based at least in part on the microphone input excitation function, a microphone input specific loudness of the microphone input audio data, the microphone input specific loudness corresponding with a perceived loudness of the microphone input audio data;
determining, based at least in part on the media input excitation function and the microphone input excitation function, a microphone partial specific loudness corresponding to the perceived loudness of the microphone input audio data in a presence of the media input audio data;
determining frequency- and time-varying media processing gains to apply to the media input audio data to produce media output audio data;
determining frequency- and time-varying microphone processing gains to apply to the microphone input audio data to produce microphone output audio data, wherein the media processing gains and the microphone processing gains are determined such that a first difference between the microphone input specific loudness and a perceived loudness of the microphone output audio data in a presence of the media output audio data is less than a second difference between the microphone input specific loudness and the microphone partial specific loudness;
applying the determined media processing gains to the media input audio data to produce the media output audio data;
applying the determined microphone processing gains to the microphone input audio data to produce the microphone output audio data and mixing the media output audio data and the microphone output audio data to produce mixed audio data.

12. The one or more non-transitory media of claim 11, wherein the perceived loudness of the microphone output audio data in the presence of the media output audio data is substantially equal to the perceived loudness of the microphone input audio data.

13. The one or more non-transitory media of claim 11, further comprising:
receiving a mode-switching indication; and
modifying at least one of the receiving, determining or mixing process based, at least in part, on the mode-switching indication.

14. The one or more non-transitory media of claim 13, wherein the modifying involves increasing a relative loudness of the microphone output audio data, relative to a loudness of the media output audio data.

15. The one or more non-transitory media of claim 14, wherein increasing the relative loudness of the microphone output audio data involves suppressing the media input audio data or pausing the media stream.

16. The one or more non-transitory media of claim 13, wherein the mode-switching indication is based, at least in part, on at least one of an indication of a head movement or an indication of an eye movement.

17. The one or more non-transitory media of claim 13, wherein the mode-switching indication is based, at least in part, on inertial sensor data corresponding to movement of a headset.

18. An audio processing apparatus, comprising:
an interface system; and
a control system configured for:
receiving, via the interface system, media input audio data corresponding to a media stream;
receiving, via the interface system, microphone input audio data from a microphone system that includes at least one microphone;
computing a media input excitation function of the media input audio data as a time-smoothed power of the media input audio data with a frequency-variant perceptual weighting;
computing a microphone input excitation function of the microphone input audio data as a time-smoothed power of the microphone input audio data with a frequency-variant perceptual weighting;
determining, based at least in part on the microphone input excitation function and according to a specific loudness function that models non-linearities in a human's perception of loudness, a microphone input specific loudness of the microphone input audio data, the microphone input specific loudness corresponding with a perceived loudness of the microphone input audio data;
determining, based at least in part on the media input excitation function and the microphone input excitation function, a microphone partial specific loudness corresponding to the perceived loudness of the microphone input audio data in a presence of the media input audio data;
determining media processing gains to apply to the media input audio data to produce media output audio data;
determining microphone processing gains to apply to the microphone input audio data to produce microphone output audio data, wherein the media processing gains and the microphone processing gains are determined such that a first difference between the microphone input specific loudness and a perceived loudness of the microphone output audio data in a presence of the media output audio data is less than a second difference between the microphone input specific loudness and the microphone partial specific loudness;

applying the determined media processing gains to the media input audio data to produce the media output audio data;

applying the determined microphone processing gains to the microphone input audio data to produce the microphone output audio data and mixing the media output audio data and the microphone output audio data to produce mixed audio data.

19. The audio processing apparatus of claim 18, wherein the perceived loudness of the microphone output audio data in the presence of the media output audio data is substantially equal to the perceived loudness of the microphone input audio data.

20. The audio processing apparatus of claim 18, wherein the control system is further configured for:

receiving a mode-switching indication; and modifying at least one of the receiving, determining or mixing processes based, at least in part, on the mode-switching indication.

* * * * *

UNITED STATES PATENT AND TRADEMARK OFFICE
CERTIFICATE OF CORRECTION

PATENT NO. : 11,740,859 B2  
APPLICATION NO. : 17/660951  
DATED : August 29, 2023  
INVENTOR(S) : Mark Alexander et al.

Page 1 of 1

It is certified that error appears in the above-identified patent and that said Letters Patent is hereby corrected as shown below:

On the Title Page

Column 1, (30) Foreign Application Priority Data, Line 1:
Delete "(WO)" and insert --(CN)-- therefor Signed and Sealed this
First Day of July, 2025

Coke Morgan Stewart
*Acting Director of the United States Patent and Trademark Office*